United States Patent [19]

Durremberger

[11] Patent Number: 4,589,740
[45] Date of Patent: May 20, 1986

[54] TRIHEDRON-SHAPED DEFORMABLE REFLECTORS

[75] Inventor: Pierre Durremberger, St. Etienne les Orgues, France

[73] Assignee: Office National d'Etudes et de Recherche Aerospatiales (ONERA), France

[21] Appl. No.: 516,370

[22] Filed: Jul. 22, 1983

[30] Foreign Application Priority Data

Jul. 22, 1982 [FR] France .................. 82 12832

[51] Int. Cl.$^4$ ............................................. G02B 26/08
[52] U.S. Cl. ..................................... 350/487; 350/102
[58] Field of Search ................ 350/487, 294, 295, 102

[56] References Cited

U.S. PATENT DOCUMENTS

| | | | |
|---|---|---|---|
| 3,493,294 | 2/1970 | Fitzmaurice et al. | 350/487 |
| 3,574,448 | 4/1971 | Paine | 350/102 X |
| 3,873,191 | 3/1975 | Veret et al. | 350/293 |
| 4,319,804 | 3/1982 | Lipkins | 350/487 |
| 4,420,222 | 12/1983 | Bret et al. | 350/295 |

FOREIGN PATENT DOCUMENTS 8124205  7/1983  France .

Primary Examiner—John K. Corbin
Assistant Examiner—Vincent J. Lemmo
Attorney, Agent, or Firm—Lowe, Price, LeBlanc, Becker & Shur

[57] ABSTRACT

A deformable trihedral reflector suitable for back reflecting an incident electromagnetic beam includes a trirectangular trihedron with three reflecting faces substantially orthogonal two by two. At least one part of the reflector is made of a piezoelectric material. The piezoelectric material is activated to vary the dihedral angles between the faces of the trihedron in the vicinity of the orthogonality to cause divergence of the reflected beam.

5 Claims, 8 Drawing Figures

TRIHEDRON-SHAPED DEFORMABLE REFLECTORS

BACKGROUND OF THE INVENTION

1. Field of the Invention

This invention relates to deformable reflectors and more particularly to optical trihedral deformable reflectors formed of three planar mirrors forming, in twos, orthogonal dihedrons at 90°±ε. Such reflectors, when illuminated by a beam from a light source, have the property of reflecting the light toward the source after reflection on each of the three faces thereof, even though trihedron orientation varies over a wide range.

The reflected light beam is cone shaped, focused on the source, with a divergence angle 2δ substantially proportional to the orthogonality defect ε of the dihedrons. The reflected light illuminates a photoelectric receiver placed near the source over an angle inversely proportional to the square of the dihedron orthogonality defect, $\epsilon^2$. Any variation in ε results in a variation in the illumination.

2. Description of the Prior Art

U.S. Pat. No. 4,319,804 discloses a hollow retroflector having three front optically flat reflecting surfaces arranged essentially in orthogonal reference planes. Each surface is on a plate having a pivotal axis perpendicular to one of the reference planes and has an adjusting device remote from its pivotal axis for fixing the plate in a position that is adjustable about its respective axis. The adjusting device and the means that establishes the pivotal axis cooperate with portions of the plates that are outside the aperture of the retroflector.

U.S. Pat. No. 3,873,191 issued Mar. 25, 1975, commonly assigned with the present invention, discloses a process for producing optical trihedrons having high precision qualities as regards orthogonality. In this procedure, a tetrahedral print is made by initially hollowing out a material (mould) using a stamp; then a tetrahedral model made of glass, silicon or any other hard material is machined by using conventional tooling to the desired accuracy 90°±ε. The three faces of the trihedron in the model are gold plated by vaporization in a vacuum under special conditions. This male model is then inserted in the mould print with a resin interlay. After resin cure, the model merely has to be extracted; the resin and the layer of gold remain fixed inside the print. A hollowed trihedron replica is thus obtained having exactly the same shape as the model.

Generally speaking, the aim is to obtain a trihedron with a stable shape and the mould is made of stabilized metal. For general purpose use, the trihedrons produced along these lines have an angle of divergence 2δ lying between 8 and 50 seconds of an arc.

SUMMARY OF THE INVENTION

The invention relates to deformable trirectangular trihedron reflectors having a triangular pyramid shape and including, at least partially, a piezoelectric material that is contracted or expanded to modulate an optical beam incident thereon. To modify the dihedral angles of the triangular pyramid while maintaining the planar aspect of the faces of the trihedron, the layers of piezoelectric material are perpendicular to the axis of the triangular pyramid and the piezoelectric stresses run parallel to this axis.

BRIEF DESCRIPTION OF THE DRAWINGS

The invention will now be described in detail with reference made to the appended drawings in which.

DESCRIPTION OF THE PREFERRED EMBODIMENTS

Figure 1:
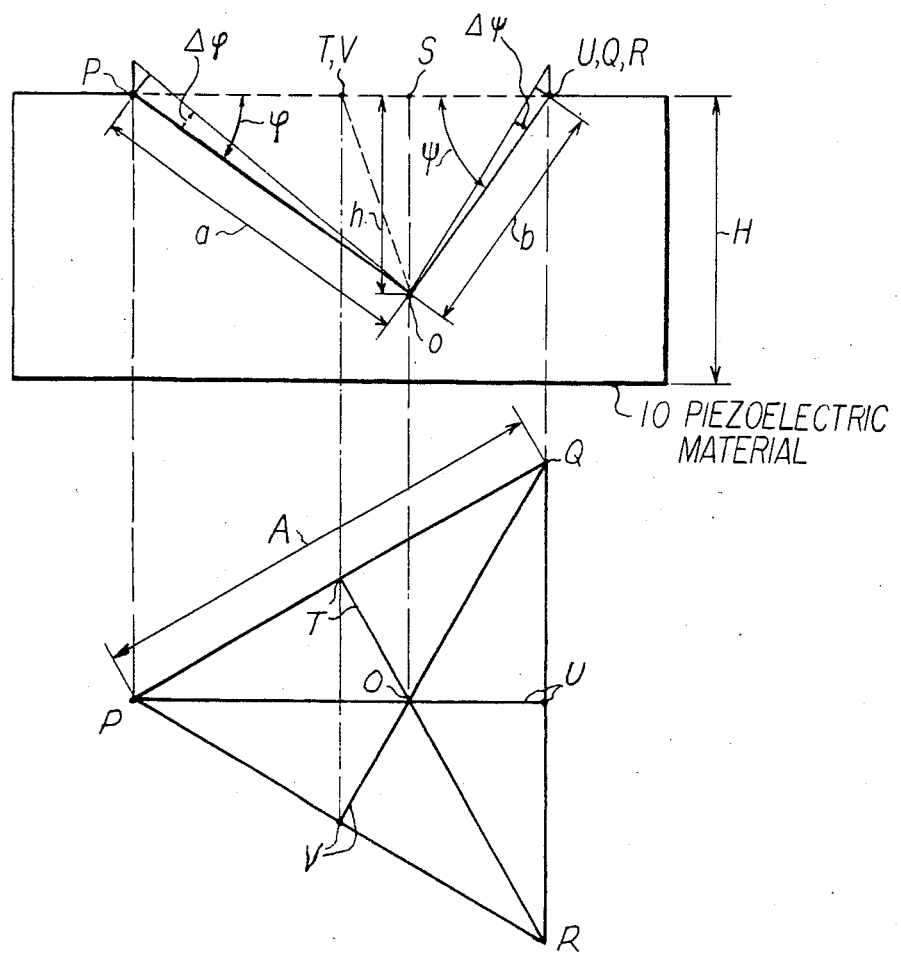
FIG. 1 is a geometric representation of a deformable trirectangular trihedron used to explain calculations for variations in the dihedral angles of the trihedron in terms of the stretch of the piezoelectric material.

In FIG. 1 is shown a trirectangular trihedron in the shape of a triangular pyramid O, PQR having edges OP, OQ, OR; the pyramid has a vertical axis OS and projections OT, OU, and OV of the axis onto the faces. It is known that the angle φ between the axis OS and each of edges OP, OQ, OR is such that:

$$\cos \varphi = \sqrt{2}/\sqrt{3} \qquad \sin \varphi = 1/\sqrt{3} \qquad \tan \varphi = 1/\sqrt{2}$$

i.e., φ=35°16′ and that the angle Ψ between the axis OS and each of its projections OT, OU, OV onto a face of the trihedron is such that:

$$\cos \Psi = 1/\sqrt{3} \qquad \sin \psi = \sqrt{2}/\sqrt{3} \qquad \tan \Psi = \sqrt{2}$$

i.e., ψ=54°44′.

Let:

A be the length of one side of the trihedrons base triangle
a be the length of one edge
b be the height of one triangular face of the trihedron
Δh be the variation in h due to the piezoelectric effect
H be the thickness of the piezoelectric plate
ΔH be the variation in H due to the piezoelectric effect
E be the voltage across the piezoelectric material per unit length
$d_{33}$ be the piezoelectric coefficient
Δφ be the piezoelectric variation in the angle φ
ΔΨ be the piezoelectric variation in the angle Ψ.

The following can easily be deduced:

$$a = A/\sqrt{2} \qquad b = A/2 \qquad h = \frac{A}{\sqrt{2} \times \sqrt{3}} = \frac{A}{\sqrt{6}}$$

$$\Delta H = d_{33} \times E \times H \qquad (1)$$

$$\Delta h = \frac{h \Delta H}{H} \qquad (2)$$

-continued $$\Delta \varphi = \frac{\Delta h \cos \varphi}{a} \quad (3)$$

$$\Delta \Psi = \frac{\Delta h \sin \varphi}{b} \quad (4)$$

$$\epsilon = \Delta \varphi + \Delta \Psi$$

By applying numerical values:
H=16 mm
A=34 mm
a=A/√2=24 mm
b=A/2=17 mm
h=A/√2×√3=13.8 mm
E=1000 volts/mm
$d_{33}=390 \times 10^{-12}$ The resultant values from equation (1) are:

$$H = 390.10^{-12} \times 10^3 \times 16$$

$\Delta H \simeq 6.2 \ \mu m$
from equation (2):

$$\Delta h = 6.2 \frac{13.8}{16} \simeq 5 \ \mu m$$

and from equations (3) and (4):

$$\Delta \varphi = \Delta \Psi \simeq 0.17 \times 10^{-3} \text{rad.}$$

$$\Delta \varphi = \Delta \Psi = 35''$$

Hence, $\Delta \varphi + \Delta \Psi = 70''$.

$(\Delta \varphi + \Delta \Psi)$ is the variation in the right angle $\widehat{POU}$. To obtain $\epsilon$, i.e., the variation in the dihedral right angle $\widehat{POQ}$, some allowance must be made for the fact that the plane POQ is inclined at 45° to the plane POU, whence $$\epsilon = (\Delta \varphi + \Delta \psi)/\sqrt{2} = 50''.$$

Figure 2:
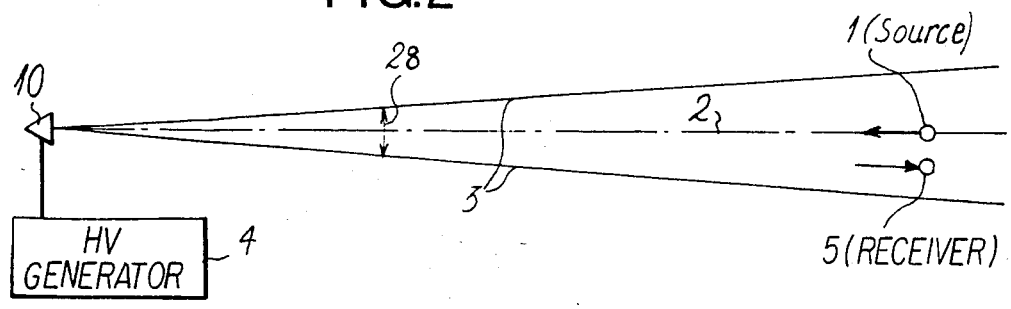
FIG. 2 is a schematic drawing of a trihedral reflector for varying the conicity of a reflected laser beam.

In FIG. 2 is illustrated a light source 1, e.g., a laser emitter, that produces a beam 2 which is incident on a deformable trihedral reflector 10, fabricated in accordance with the invention. Reflector 10 sends a return beam 3, superposed on the initial beam; and the return beam has a divergence angle of 2δ and is selectively incident on receiver 5, depending on the value of 2δ and the displacement of the receiver from the common axis of beams 2 and 3. A variable voltage supplied by a generator 4 controls deformation of trihedral reflector 10 to vary the divergence angle 2δ; (2δ)=5ε.

Figure 3:
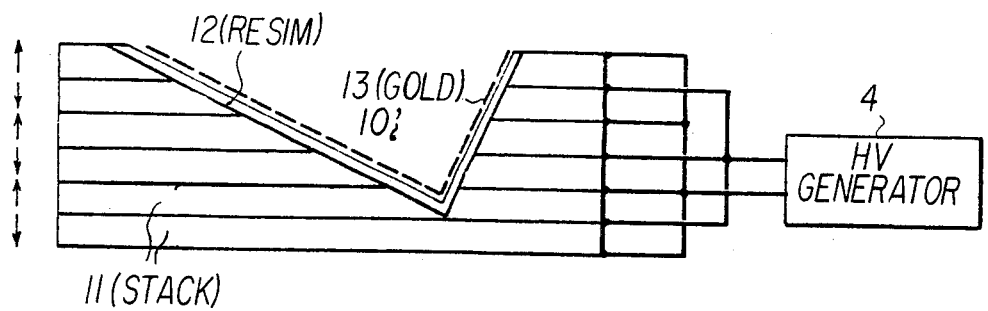
FIG. 3 is a side schematic view of a deformable trihedron in accordance with the invention wherein a tetrahedron is hollowed into a piezoelectric material.

As illustrated in FIG. 3, the deformable trihedral reflector includes stacked piezoelectric discs 11; an exemplary piezoelectric material is a piezoelectric ceramic known commercially as PXE 21. Stacked discs 11 lie in planes perpendicular to the trihedron axis (OS in FIG. 1). Discs 11 include lower and upper metalized terminal faces that are alternately and inversely biased and are fed alternately and oppositely by the the generator 4. The lower and upper faces of the even-number discs are respectively connected across positive and negative poles of the generator while the lower and upper faces of the odd-number discs are connected to the negative and positive poles of the generator.

The trihedron is manufactured as described in the aforesaid U.S. patent. Resin layer 12 is interlaid between stamp and print (the print is made in the piezoelectric material) and gold layer 13 which is under manufacture is transferred from the stamp to the print.

Figure 4:
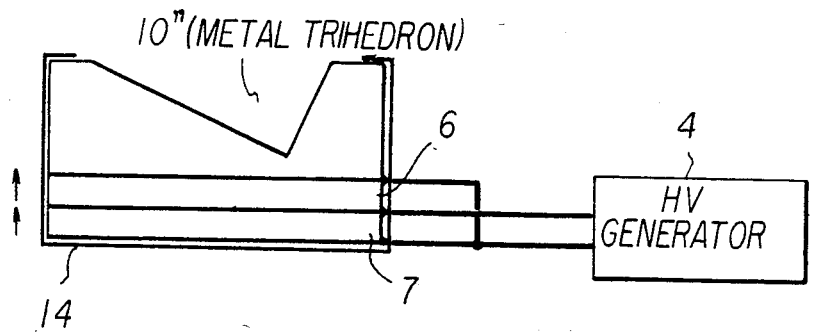
FIGS. 4 and 5 are side schematic views of deformable trihedrons in accordance with the invention in which the tetrahedron is partially formed of piezoelectric material and partially of metal.
Figure 5:
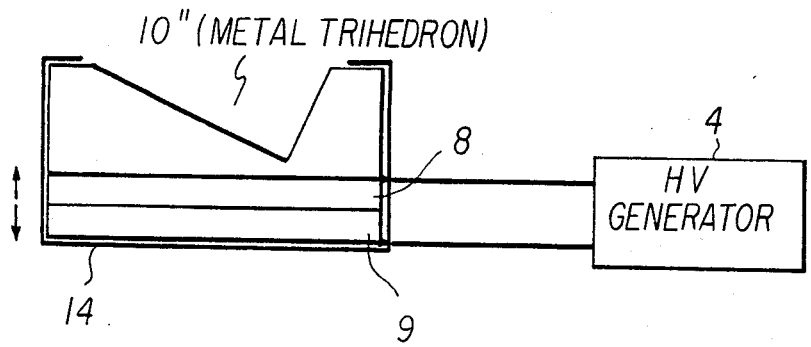

In FIGS. 4 and 5, the trihedron 10 is made of metal, e.g., aluminum, and the piezoelectric discs 6 and 7, or 8 and 9 are glued beneath the trihedron. To exert the piezoelectric effect on trihedron 10, the trihedron and the piezoelectric discs 6 and 7, or 8 and 9 are clamped inside a box 14 having a lateral wall folded over the edge of the trihedron. The discs 6 and 7 are biased in the same direction and are fed oppositely by source 4, while discs 8 and 9 are biased oppositely and are fed in series by source 4.

Figure 6:
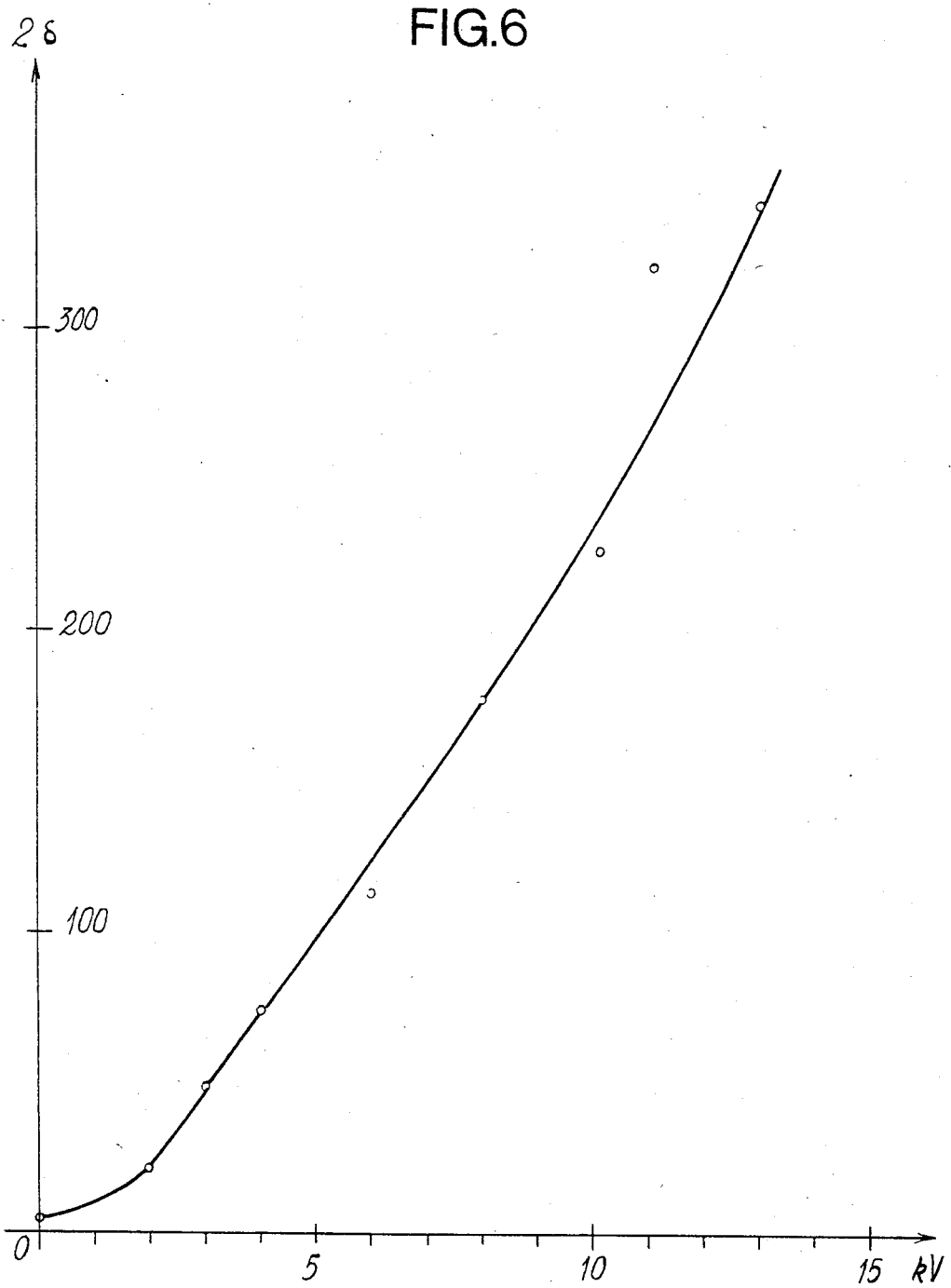
FIG. 6 is a curve of reflector divergence (2δ) versus piezoelectric control voltage in kilovolts.

FIG. 6 is a curve of the divergence angle 2δ of the return beam 3 in FIG. 2 in terms of the voltage across the piezoelectric material.

The curve is linear from 2 to 15 kV and has an average slope of 30″ per kV. Between 2000 and 3000 Volts, for example, 2δ varies at a rate of 1.5 which corresponds to an illumination variation of $1.5^2 \simeq 2.2$.

A general application of the deformable trihedral reflector in the invention lies in laser reflection systems in which a reflected beam is divergence modulated by information at the reflection point.

Figure 7:
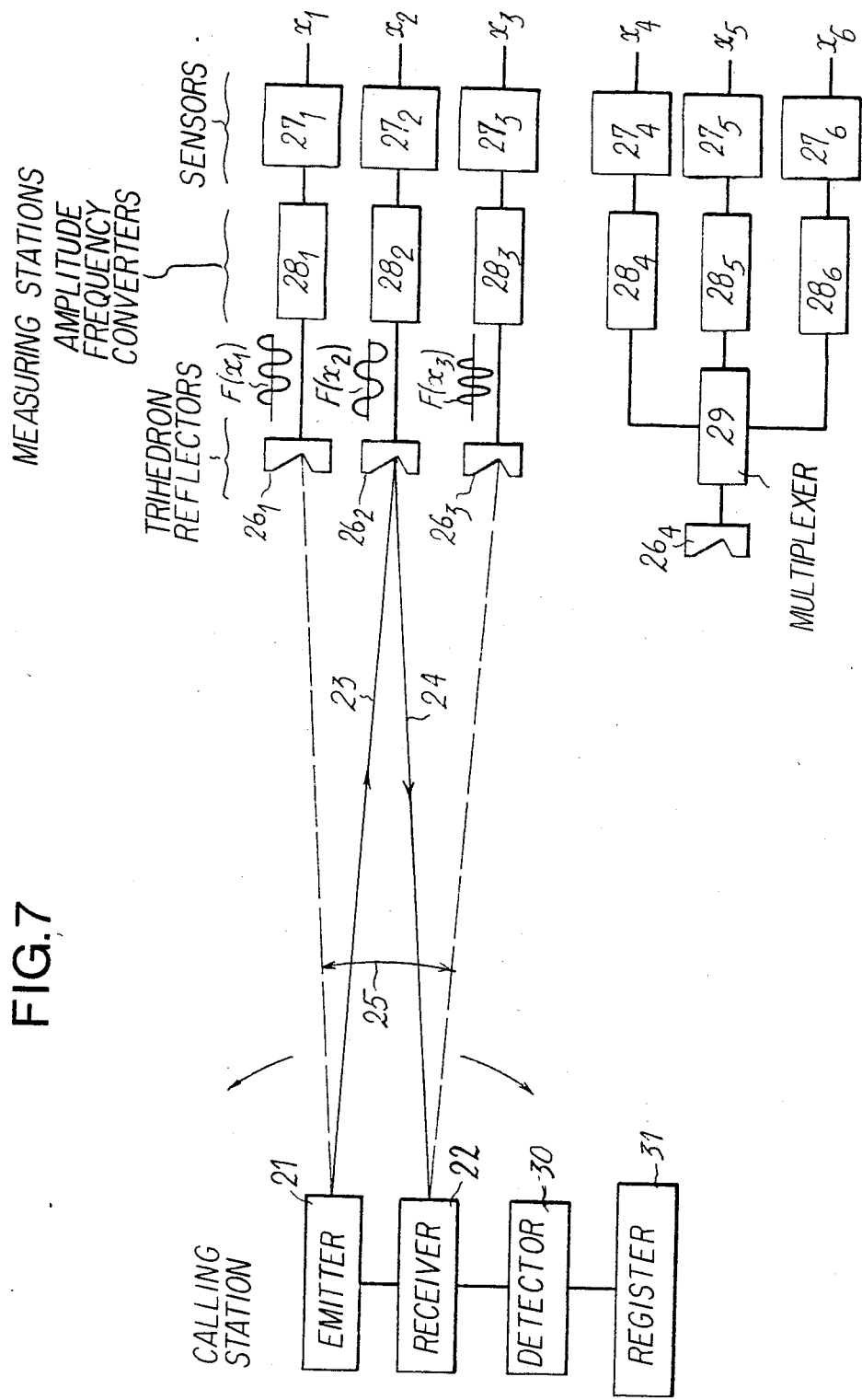
FIG. 7 is a block-diagram of an optical telemeasurement system including an application for deformable trihedral reflectors.

In FIG. 7 are illustrated a continuous light emitter 21 and a photoelectric receiver 22 located adjacent to the emitter. The beam 23 transmitted from emitter 21 is scanned over an angular sector 25 by rotatably mounting the emitter/receiver or by means of an acousto-optical device. The emitted beam 23 is successively incident on deformable trihedral reflectors $26_1$ to $26_4$ that reflect the incident beam 23 and retroreflect beam 24 toward the receiver while modulating the divergence. For this purpose, magnitude sensors $27_1$ to $27_6$ for measuring variable quantities $x_1$ to $x_6$ capture said quantities and are connected to amplitude frequency converters that control the trihedral reflectors. The converters can be connected individually to the trihedrons or several converters can be connected to a single trihedron via a multiplexer 29.

The photoelectric receiver 22 is connected to a detector 30 that drives recorder 31. The quantities $x_1$ to $x_6$ are recorded by recorder 31 in sequence and in synchronism with the incident beam scan.

Figure 8:
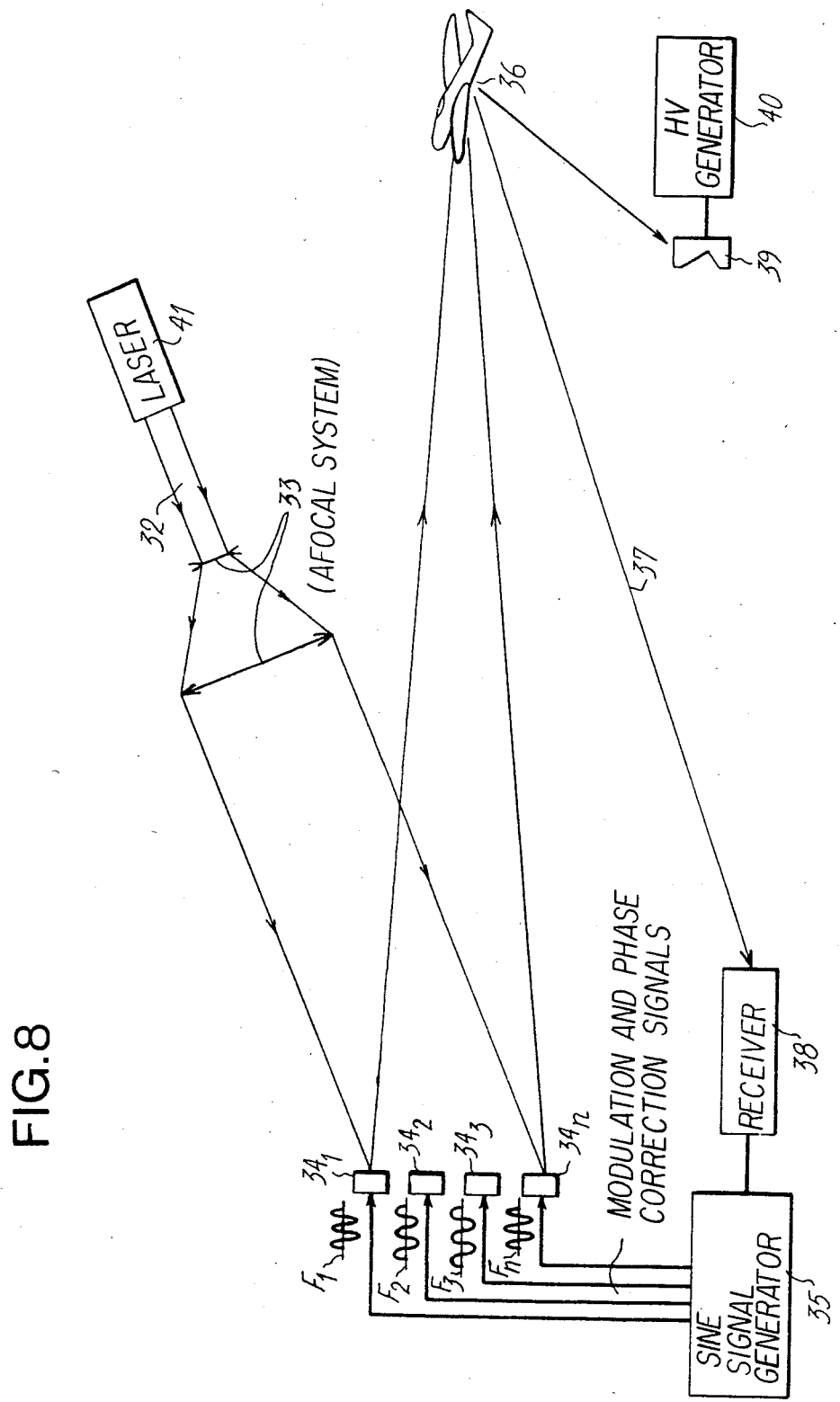
FIG. 8 is a block-diagram of a scrambling system for adaptive optical arrangements.

FIG. 8 is a schematic diagram of a system for defense against adaptive optical arrangements using the trihedrons of the invention. These optical arrangements illustrated in FIG. 8 concentrate light energy on a target by compensating for the atmospheric defocusing effect. These arrangements include a combination of several mirrors, each vibrated by a piezoelectric ceramic element at a different vibration frequency $F_1$, $F_2$ . . . $F_n$. A detector picks up the light retrodiffused by the target, and a filtering system selects that part of the received signal corresponding to each mirror. A slaved set-up corrects the mean position of each mirror such that a maximum signal is received corresponding to the mirror in question.

The divergence angle of laser beam 32 is increased through an afocal optical arrangement 33, causing the beam to be incident on plural vibrating mirrors $34_1$ to $34_n$. Mirrors $34_1$ to $34_n$ are vibrated at frequencies $F_1$, $F_2$ . . . $F_n$ by vibration control signals produced by sinusoidal generators included in an electronic device 35. The direction modulated beams reflected by mirrors $34_1$ to $34_n$ strike a target 36, which reflects light beam 37 so it is incident on a photoelectric receiver 38. Receiver 38 is connected to the electronic device 35 which filters the components of the retrodiffused light and selectively dephases the vibration control signal generators so as to maximize the signal reflected by the target.

One or several deformable trihedral reflectors, such as reflector 39, are located on the target and are deformed by a control signal or signals produced by the generator 40. The deformation control signal is determined such that slaving of the system is impossible. With this in mind, the trihedral reflectors are merely controlled by a signal having a spectrum including at least one of the vibration frequencies.

The invention has been described with a deformable trihedral reflector composed of a stack of piezoelectric plates but the scope of the invention is nevertheless respected with a trihedron made of a single block of piezoelectric material, whereupon the electrodes are respectively disposed on the front and rear faces of the block.

What I claim is:

1. A deformable trihedral reflector suitable for the retroreflection of an electromagnetic incident beam or a system for modulating the angle of divergence of a reflected beam comprising: a tri-rectangular trihedron having first, second and third reflecting planar faces arranged so that the first and second faces are substantially orthogonal, the second and third faces are substantially orthogonal, and the first and third faces are substantially orthogonal, at least one part of the trihedron including a piezoelectric material, and means connected to activate said piezoelectric material for controlling the dihedral angles between the faces of the trihedron in the vicinity of the orthogonality and to consequently control the reflected beam divergence angle, the trihedral reflector being a hollow portion in a stack of piezoelectric plates, said plates being perpendicular to the ternary axis of symmetry of the trihedron, the means for activating the piezoelectric material being connected to the plates to change the thickness of the plates.

2. A deformable trihedral reflector suitable for the retroreflection of an electromagnetic incident beam or a system for modulating the angle of divergence of a reflected beam comprising: a tri-rectangular trihedron having first, second and third reflecting planar faces arranged so that the first and second faces are substantially orthogonal, the second and third faces are substantially orthogonal, and the first and third faces are substantially orthogonal, at least one part of the trihedron including a piezoelectric material, and means connected to activate said piezoelectric material for controlling the dihedral angles between the faces of the trihedron in the vicinity of the orthogonality and to consequently control the reflected beam divergence angle, the trihedral reflector being a hollow portion in a hard material, the piezoelectric material being formed of plates positioned above the tip of the trihedron and perpendicular to the ternary axis of symmetry of the trihedron, and the means for activating the piezoelectric material being connected to the plates to change the thickness of the plates.

3. A deformable trihedral reflector suitable for the retroreflection of an electromagnetic incident beam or a system for modulating the angle of divergence of a reflected beam comprising: a tri-rectangular trihedron having first, second and third reflecting planar faces arranged so that the first and second faces are substantially orthogonal, the second and third faces are substantially orthogonal, and the first and third faces are substantially orthogonal, at least one part of the trihedron including a piezoelectric material, and means connected to activate said piezoelectric material for controlling the dihedral angles between the faces of the trihedron in the vicinity of the orthogonality and to consequently control the reflected beam divergence angle, the trihedron being shaped as a triangular pyramid having an axis in the general direction of the beam axis, the piezoelectric material being arranged in layers perpendicular to the pyramid axis, the piezoelectric material being connected to a signal source so that piezoelectric stresses established therein extend parallel to the pyramid axis.

4. An optical communication system comprising an optical source for transmitting an optical beam along a beam axis, a retroreflector for the optical beam positioned on the beam axis for reflecting the optical beam back toward the source, the reflected beam having a divergence angle, a receiver for the reflected beam, and means for controlling the reflected beam divergence angle, the reflected beam divergence angle and the receiver position relative to the beam axis and the retroreflector being such that the reflected beam is incident on the receiver, the retroreflector including: a tri-rectangular trihedron having first, second and third reflecting planar faces arranged so that the first and second faces are substantially orthogonal, the second and third faces are substantially orthogonal, and the first and third faces are substantially orthogonal, an intelligence signal source, and means responsive to the intelligence signal source for controlling the dihedral angles between the faces of the trihedron in the vicinity of the orthogonality and to consequently control the reflected beam divergence angle, the means for controlling including a piezoelectric material connected to be responsive to the signal source, the trihedron being arranged so the planar faces thereof remain planar despite variations in the dihedral angles in response to expansion and/or contraction of the thickness of the piezoelectric material that controls the dihedral angle between the trihedron faces, the trihedron being shaped as a triangular pyramid having an axis in the general direction of the beam axis, the piezoelectric material being arranged in layers perpendicular to the pyramid axis, the piezoelectric material being connected to the signal source so that piezoelectric stresses established therein extend parallel to the pyramid axis.

5. A retroreflector for an optical communication system including an optical source for transmitting an optical beam along a beam axis and a receiver for the beam reflected by the retroreflector in response to the beam from the optical source being incident on the retroreflector, the retroreflector comprising: a tri-rectangular trihedron having first, second and third reflecting planar faces arranged so that the first and second faces are substantially orthogonal, the second and third faces are substantially orthogonal, and the first and third faces are substantially orthogonal, an intelligence signal source, and means responsive to the intelligence signal source for controlling the dihedral angles between the faces of the trihedron in the vicinity of the orthogonality and to consequently control the reflected beam divergence angle, whereby the retroreflector controls the reflected beam divergence angle to selectively control the incidence of the reflected beam on the receiver, the trihedron being arranged so the planar faces thereof remain planar despite variations in the dihedral angles in response to expansion and/or contraction of the thickness of the piezoelectric material that controls the dihedral angle between the trihedron faces, the trihedron being shaped as a triangular pyramid having an axis in the general direction of the beam axis, the piezoelectric material being arranged in layers perpendicular to the pyramid axis, the piezoelectric material being connected to the signal source so that piezoelectric stresses established therein extend parallel to the pyramid axis.

* * * * *